United States Patent [19]

Nakano

[11] Patent Number: 4,734,853
[45] Date of Patent: Mar. 29, 1988

[54] TERMINAL CONTROL SYSTEM
[75] Inventor: Kazuo Nakano, Aichi, Japan
[73] Assignee: Hitachi, Ltd., Tokyo, Japan
[21] Appl. No.: 803,612
[22] Filed: Dec. 2, 1985
[30] Foreign Application Priority Data Dec. 3, 1984 [JP] Japan ................................ 59-255438

[51] Int. Cl.$^4$ .............................................. G06F 3/00
[52] U.S. Cl. ................................................ 364/200
[58] Field of Search ... 364/200 MS File, 900 MS File

[56] References Cited
U.S. PATENT DOCUMENTS 4,079,452 3/1978 Larson et al. ...................... 364/200

Primary Examiner—Raulfe B Zache
Attorney, Agent, or Firm—Antonelli, Terry & Wands

[57] ABSTRACT

A terminal control system in an online system having a central processing system for executing different application programs, a terminal controller connected to the central processing system, and a plurality of terminals connected to the terminal controller. Each terminal includes at least one logical terminal for performing a plurality of different applications and the terminal controller includes a protocol execution unit for communicating with the central processing system and control tables prepared for respective logical terminals. In the system, if a macroinstruction containing application identification information is received when an application is initiated or switched from the logical terminal, the terminal controller stores the application identification information in one of the control tables associated with the logical terminal, and during execution of an application, the protocol execution unit extracts a protocol most suitable for the application so that the terminal achieves communication with the central processing system in accordance with the extracted protocol.

5 Claims, 5 Drawing Figures

FIG. 4

|  |  | ENQUIRY / ANSWER PROCESSING | FILE TRANS- MISSION | EMULATOR | REMOTE JOB ENTRY |
|---|---|---|---|---|---|
| LINE CONNECTION | A | ◯ | ◯ | ◯ |  |
|  | B | ◯ |  | ◯ | ◯ |
|  | C | ◯ |  |  |  |
| DATA LINK ESTABLISH- MENT | A | ◯ | ◯ |  | ◯ |
|  | B |  |  | ◯ |  |
|  | C | ◯ |  | ◯ |  |
|  | D |  | ◯ | ◯ | ◯ |
| INFORMATION TRANSFER | A | ◯ | ◯ | ◯ | ◯ |
| TERMI- NATION | A | ◯ |  | ◯ | ◯ |
|  | B |  | ◯ | ◯ |  |
| LINE DIS- CONNECTION | A | ◯ |  | ◯ | ◯ |
|  | B | ◯ | ◯ |  | ◯ |

TERMINAL CONTROL SYSTEM

BACKGROUND OF THE INVENTION

The present invention relates to a terminal control system, and in particular, to a terminal control system connected to a central processing system executing a plurality of different applications in which a plurality of applications can be executed by dynamically switching them at a terminal.

With recent developments of computer networks, there have been utilized various types of terminals, such as a terminal for an enquiry/answer system, a terminal for a file transfer operation, a terminal for emulation, and a terminal for a remote job entry processing. In the past, an online application has been fixed to a communication line in the online system, namely, different applications have been assigned to respective lines; however, the online system at present enables a plurality of online applications to be executed through a common communication line.

A terminal control system which is easy to adapt to the central processing system executing a plurality of applications and which prevents the hardware configuration from being fixed to a particular application is described in the Japanese Patent Unexamined Publication No. 58-54436. The conventional terminal control system includes a plurality of different control rule tables or protocols and a plurality of processing circuits, as shown in FIG. 5 so as to perform operations in cooperation with those for each application established in the central processing system, the protocol tables, and the processing circuits. In detail, the processing specifications for processors 53 and 54 of a central system 51 are completely different from each other. A terminal controller 52 is connected to a plurality of different terminals 68, 69, 70 . . . , in which the terminal 68 is associated with a channel or circuit including the processor 53 and the terminals 69–70 are associated with another circuit including processor 54 in data processings. Upon receiving an instruction from the processor 53, a control unit 62 refers to a table 64 to send an address of a processing program 55 to a controller processor 60, which in turn executes a processing program 66 to control the terminal 68. The processor 54 also performs a processing in the same manner stated above. In FIG. 5, reference numerals 55 and 56 indicate program memory units, reference numerals 57 and 58 indicate control units, and reference numerals 59 and 61 indicate interface portions.

In the conventional system described above, there are provided a plurality of completely different types of protocol tables and a plurality of processing circuits in which different protocols can be stored in the terminal controller 52. As can be seen from FIG. 5, however, the terminals 68 to 70 execute fixed applications, respectively. Namely, a protocol table is exclusively assigned to a terminal, which prevents a terminal from achieving a plurality of different applications.

SUMMARY OF THE INVENTION

It is therefore an object of the present invention to provide a terminal control system which is easily adaptable for a central processing system executing a plurality of different applications by dynamically switching different applications at a terminal and prevents the terminal from being exclusively fixed to an application, thereby solving the problems of the prior art.

To achieve the object, according to the feature of the present invention there is provided a terminal control system in an online system having a central processing system for executing different application programs, a terminal controller connected to the central processing system, and a plurality of terminals connected to said terminal controller, wherein each terminal has at least one logical terminal for executing a different application and the terminal controller includes protocol execution means for communicating with the central processing system and control tables prepared corresponding to at least one logical terminal; and wherein if a macroinstruction added with application identifying information is received when an application is initiated or switched from the logical terminal, the application identification information is stored in a control table for the relevant logical terminal; and during execution of an application, the protocol execution means refers to the application identification information and selects a protocol most suitable for the referred-to application so that the terminal may communicate with the central processing system based on the selected protocol.

BRIEF DESCRIPTION OF THE DRAWINGS

The present invention will be apparent from the following detailed description taken in conjunction with the accompanying drawings in which:

FIG. 4 is an explanatory diagram for extracting a protocol in the flowchart of FIG. 3.

DESCRIPTION OF THE PREFERRED EMBODIMENT

Figure 1:
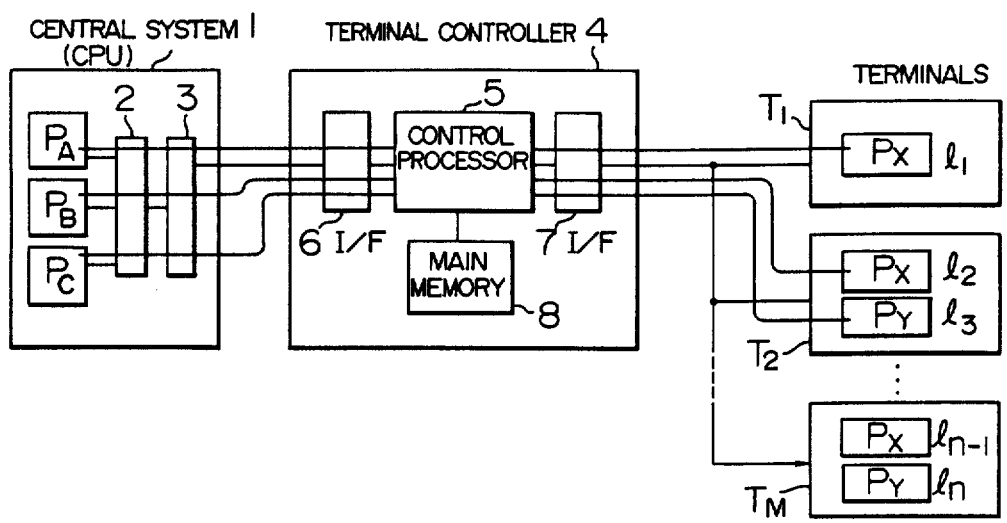
FIG. 1 is a shcematic block diagram illustrating a terminal control system according to an embodiment of the present invention.

FIG. 1 shows a terminal control system according to an embodiment of the present invention.

A central processing system (CPU) 1 includes in a memory unit or in each memory unit a plurality of application programs $P_A$, $P_B$, and $P_C$ each having different processing specifications. The application programs $P_A$, $P_B$, $P_C$ in CPU 1 usually cooperate with application programs $P_X$, $P_Y$, . . . in the terminals through a communication control program in a processor 2 and a communication controller 3 to perform data transfers between CPU 1 and the terminal side. The application programs $P_A$, $P_B$, $P_C$ may include a production control program, enquiry processing program and a general-purpose online processing program, respectively, for example. Various types of such application programs may be provided according to needs.

On the other hand, a terminal controller 4 is connected to a plurality of terminals $T_1$, $T_2$, . . . , $T_M$; and the terminals $T_1$ and $T_2$ are provided with a logical terminal $l_1$ and two logical terminals $l_2$ and $l_3$, respectively. It is assumed that the logical terminal $l_1$ executes an application program $P_X$ and the logical terminals $l_2$ and $l_3$ execute application programs $P_X$ and $P_Y$, respectively. In this system, a "logical terminal" is defined as a virtual terminal designated in terms of application. The application programs $P_X$ and $P_Y$ indicate, by way of example, an equiry/answer program and a file transfer program which are executed in the terminal side, respectively. One or more application programs may be loaded in each terminal T.

The terminal controller 4 comprises a processor 5, a communication control mechanism 6, a station control mechanism 7, and a main memory 8 for supporting communication protocols to assist data communication between the application programs $P_A$, $P_B$, and $P_C$ in the central processing system 1 and the application programs $P_X$ and $P_Y$ on the terminal side. The controller processor 5 executes an operating system (OS) comprehensively controlling the terminal controller 4, the communication control mechanism 6 controls data transmission to and from the central processing system 1, and the station control mechanism 7 controls data transmission to and from a group of logical terminals $l_1$, $l_2$, $l_3$, ..., $l_n$.

Figure 2:
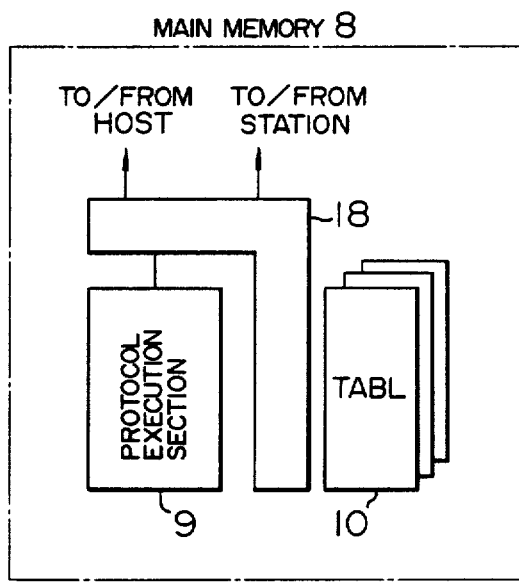
FIG. 2 is a schematic diagram illustrating an arrangement of programs and tables stored in a memory.

FIG. 2 illustrates the contents stored in the memory 8 of FIG. 1.

The main memory 8 of the terminal controller 4 includes a protocol execution program 9, control tables 10, and a logical terminal control program 18. The logical terminal control program 18 is read out by the controller processor 5 and is executed to achieve the distribution and scheduling with respect to the group of terminals $l_1$-$l_n$ (i.e., sequencing of processing requests from terminals $l_1$-$l_n$ and processing of the requests), reception of macro-instructions from the application programs $P_X$, $P_Y$ on the terminal side, and queue processing for transmission and reception. The protocol execution program 9 is read out by the processor 5 to extract (or to select as a subset) a protocol for a scheduled logical terminal, to control the network according to the protocol, to control a session, data transfer and data flow, and to effect data transmission and reception. Control tables 10 are assigned to respective logical terminals and are used in common to a plurality of applications.

Figure 3:
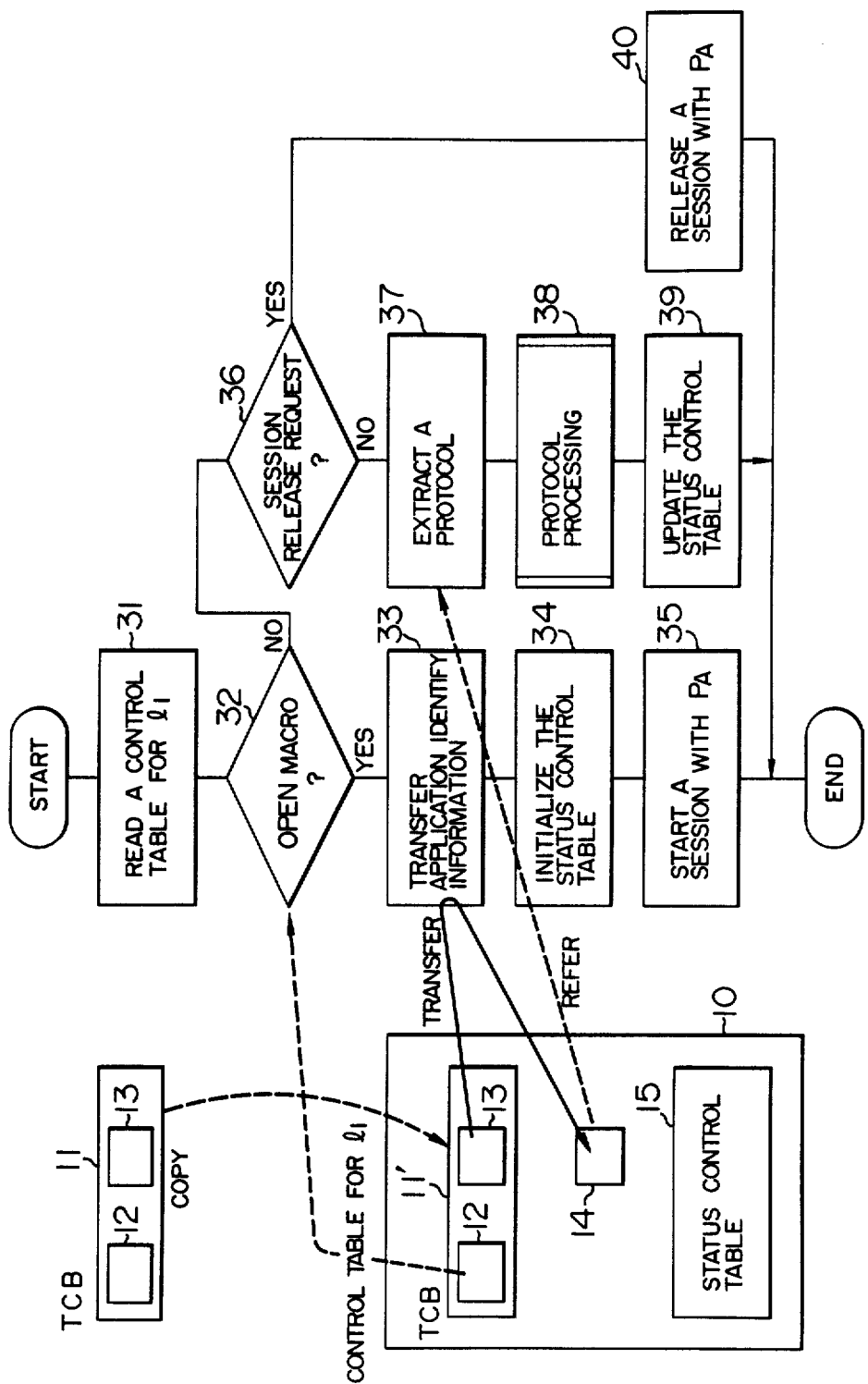
FIG. 3 is a processing flowchart of a protocol execution program in a protocol execution portion of FIG. 2.
Figure 5:
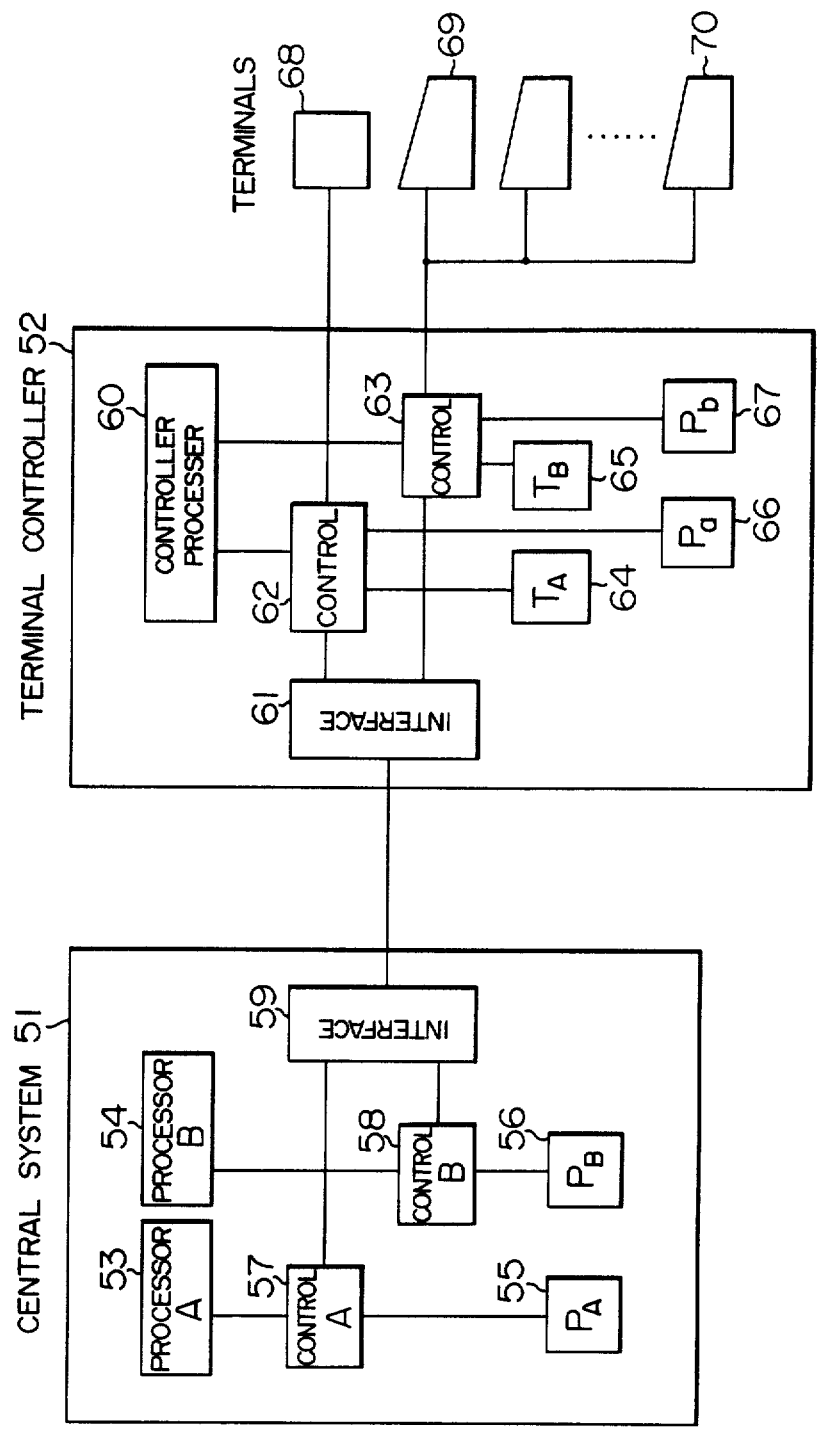
FIG. 5 is a block diagram illustrating a conventional terminal control system for executing a plurality of applications.

FIG. 3 shows a processing outline flowchart of the protocol execution program of FIG. 2.

In the following, it will be described processes of a session from when the session is established between the application programs $P_X$, $P_Y$ on the terminal side and the application programs $P_A$-$P_C$ in the central processing system to when it is released after a data communication is achieved.

When a terminal $T_1$ is powered on and an initial setup operation is performed to load an application program $P_X$ into the logical terminal $l_1$, a task control block (TCB) is first generated into the application program $P_x$. The TCB 11 contains a function code and application identification information in fields 12 and 13 of a TCB register, respectively. The function code indicates an OPEN macroinstruction. Then, when initiated by issuing of the OPEN macroinstruction, the TCB is set in a TCB register 11' of the terminal controller 4, and particularly, the function code is set in a function field 12 of the register 11' and the application indentification information is set in a macroqualification field of the register 11'. Under control of the processor 5, the terminal controller 4 receives the TCB from the terminal $T_1$ via the station control interface 7, thereby initiating the control by use of a logical terminal control program 18. When the processor 5 fetches and executes the logical terminal program 18, the distribution and scheduling with respect to the group of logical terminals $l_1$-$l_n$ are effected, then control is passed to the protocol execution program 9 with an input parameter containing the first address information of the control table 10 corresponding to the logical terminal $l_1$ that has issued the OPEN macroinstruction. At the same time, the content of the TCB sent from the logical terminal $l_1$ is copied into the relevant control table 10. The control table 10 for each logical terminal comprises a TCB, an application identification field 14, and a status control table 15 as shown in FIG. 3. The copy operation is carried out on a TCB register 11'.

The protocol execution program 9 structured as a reentrant program reads control table information (step 31) of the logical terminal $l_1$ to be processed based on the first address information of the control table 10 (for the logical terminal $l_1$) supplied as the input parameter and refers to the function field 12 of the copied TCB register 11'. If the content of the function field indicates an OPEN macroinstruction, the protocol execution program 9 transfers to the application identification store field 14 the application identification information set to the macro qualification field 13 (step 33). The status control table 15 is then initialized (step 34) and a request is issued to start a session with the program $P_A$ in the central processing system (step 35). When the logical terminal control program 18 is executed, the request is linked to the application program $P_A$ in the central processing system via the communication control interface 6 and the communication controller 3 and processor 2 of the central processing system 1. As a method for selecting an application program in the central processing system and for requesting initiation of a session, it has been well known to send a LOG.ON message or an INITIATE-SELF command to the central processing system 1. This method is also applicable to the embodiment. After a session between the application program $P_A$ in the central processing system 1 and the application program $P_X$ on the terminal side is established, data is communicated according to a protocol most suitable for the application. Referring to FIG. 3 again, the operation of data communication will be described. When a data send or receive request macroinstruction is issued from the application program $P_X$ on the terminal side, control is transferred from the logical terminal control program 18 to the protocol execution program 9 in the same manner as for the OPEN macroinstruction. In the protocol execution program, the TCB 11 of the control table 10 is first referred to. After it is found that the request is neither an OPEN macroinstruction nor a session release request (steps 32 and 36), the application identification field 14 of the control table 10 is examined to determine the application configuration being executed so that a protocol most suitable for the application configuration is extracted (as a subset) (step 37).

FIG. 4 illustrates an operation to produce a protocol subset.

In accordance with a protocol, the processing is executed in the order of a line connection, a data link setup, a data transfer, a termination, and a line disconnection, for example. Among the detailed procedures A, B, C and D respectively of these operations, only those required for the enquiry/answer processing, file transmission, emulator, and remote job entry are marked with a small circle in FIG. 4. That is, when an application configuration is detected, the protocol execution program 9 extracts only a subset of protocol corresponding to the items marked with a small circle and executes only the associated procedures.

The procedure for extracting the subset protocol is beforehand determined for each application configuration with respect to the central processing system 1. According to the extracted subset of protocol, the control of the network, session, data transfer, and data flow and the data send and receive operations are carried out (step 38). The status control table 15 is updated depending on the event having occurred during the processing (step 39). The status control table 15 representing the current status of the logical terminal $l_1$ is used as basic information by the protocol execution program 9 to process a send/receive request from the terminal $T_1$ and the various commands and data received from the central processing system 1. Finally, when an application request is completed, a step 36 of FIG. 3 checks whether or not the session is requested to be released. If this is the case, the application program $P_A$ in the central processing system 1 and the session are released (step 40). This is achieved in response to a session release request issued from the central processing system 1 when the protocol execution program 9 detects a session release request from the application program $P_X$ on the terminal side, a request to release the program $P_X$ on the terminal side, or a power-off condition of the terminal $T_1$. As a method for releasing the session and the application program $P_A$ in the central processing system, it has been well known to send a LOG.OFF message or a TERMINATE-SELF command to the central processing system 1.

Although the foregoing have described the case where the application program $P_X$ loaded in the logical terminal $l_1$ of the terminal $T_1$ communicates a data with the application program $P_A$ in the central processing system 1, the operations are performed in the completely same fashion also for the logical terminals $l_2$ and $l_3$ of the terminal $T_2$. Any application program can be switched at any timing so as to be loaded in a logical terminal.

In the embodiment as described above, a plurality of logical terminals can be assigned to a physical terminal so that the different online applications, for example, the enquiry/answer and file transfer applications are achieved at the same time. Since the control tables 10 are used in common to applications, there are needed only as many control tables 10 as there are logical terminals, so that the memory area required for the control tables 10 can be reduced. In accordance with the embodiment, when a terminal and a terminal controller are integrated into a unit, the control system can be applied to the stand-alone system and to the master workstation in the multiworkstation system.

According to the feature of the present invention as described above, since a plurality of applications can be dynamically switched and executed by use of a terminal (by each station in the multiworkstation system), the terminal need not be fixed to an application and matching or adaptation of each terminal to the central processing system executing a plurality of different applications can be easily established.

I claim:

1. A terminal control system in an online system having a central processing system for executing different application programs, a terminal controller connected to said central processing system and a plurality of terminals connected to said terminal controller, each of said plurality of terminals including at least one logical terminal for executing a different application program, said terminal controller comprising: protocol execution means for controlling communication between said terminals and said central processing system;

control tables associated with respective logical terminals for storing application identification information; and means responsive to a macroinstruction containing application identification information received from a particular logical terminal when an application program is initiated or switched by said particular logical terminal one of said control tables associated with said particular logical terminal; wherein said protocol execution means includes means responsive to application identification information stored in said control tables for extracting a protocol most suitable for an application program being executed so that a terminal having said particular logical terminal communicates with said central processing system in accordance with said extracted protocol.

2. A terminal control system according to claim 1, wherein said protocol execution means includes, a processor for executing an operating system controlling said terminal controller, and store means for storing predetermined protocol execution programs and logical terminal control programs for controlling said control tables and said logical terminals of said plurality of terminals.

3. A terminal control system according to claim 2 wherein said control tables are equal in number to that of the logical terminals, said control tables being used in common to said applications, and said logical terminal control programs include instructions executing distribution and scheduling with respect to said logical terminals, processing to receive macroinstructions from application programs issued from any of said plurality of terminals, and processing to process queues of send and receive requests.

4. A terminal control system according to claim 3 wherein said protocol execution programs include instructions to establish a subset of protocol for a scheduled terminal and to enable execution of a network control, a session control, a transfer control, a data flow control, and data send/receive operations in accordance with the protocol.

5. A terminal control system according to claim 1 wherein each of said control tables comprises a task control block having a function field for setting a macroinstruction and a macro qualifier field for storing application identification information.

* * * * *